358-86. OR 2,888,515 SR
SEARCH ROOM

May 26, 1959 R. C. ABBETT ET AL 2,888,515

REDUCTION OF GHOST IMAGES IN TELEVISON

Filed June 7, 1955

INVENTORS
ROY C. ABBETT &
KARL SOLOMON
BY
Charles H. Brown
ATTORNEY

United States Patent Office 2,888,515

Patented May 26, 1959

2,888,515

REDUCTION OF GHOST IMAGES IN TELEVISION

Roy C. Abbett, Audubon, and Karl Solomon, Haddon Heights, N.J., assignors to Radio Corporation of America, a corporation of Delaware Application June 7, 1955, Serial No. 513,770

5 Claims. (Cl. 178—6)

Figure 1:
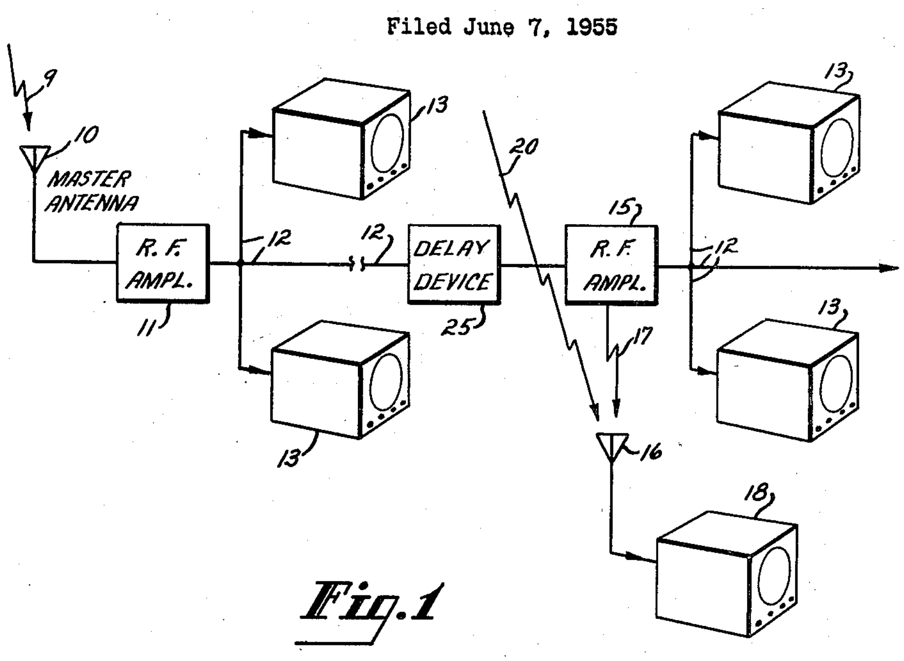

This invention relates to the reduction of ghost images on the screen of a television receiver caused by the reception of radio frequency signals from a transmitter over two paths of different electrical lengths, where at least one of the paths includes a point at which a delay device may be inserted.

The invention is useful in community television systems where the signal received by a single master antenna is amplified and sent by coaxial lines to a number of subscribers located where it is difficult to receive the transmitted signal directly. The coaxial distribution lines may extend several miles so that radio frequency amplifiers are necessary at various points along the line. It is economically impractical to so completely shield the coaxial line and the radio frequency amplifiers that no energy is radiated therefrom. A near-by receiving antenna and receiver, not associated with the community system, but designed to receive the transmitted signal directly, may receive enough of the signal from a radio frequency amplifier to cause a ghost image on the receiver screen. The ghost image is horizontally displaced to the right relative to the main image and results because the signal via the community system is delayed in passing thru the coaxial lines and amplifiers, relative to the signal received directly from the transmitter.

The invention is also useful in connection with a television booster station which is advantageously located for receiving a signal from a distant transmitter and for amplifying and retransmitting the signal to areas where the direct signal cannot be clearly received. In this case, a receiver may get a direct signal, and also a delayed signal via the booster station. The ghost image will appear to the left or right of the main image depending on the path over which the stronger signal is received.

It is an object of this invention to minimize ghost images on a television receiver which receives the same signal over two paths of different electrical length.

It is another object to provide an improved community master antenna system which minimizes ghost images on near-by television receivers not connected to the community system.

It is a further object to provide an improved television booster station which minimizes ghost images on television receivers positioned where signals can be received directly and also via the booster station.

Briefly, the invention involves the insertion of a delay device in one of two signal paths from a television transmitter to a television receiver. The delay device introduces a delay such that the signal over one path is delayed relative to the signal over the other path by an amount equal to an integral multiple including unity of the time of one complete scan line of the television system. For example, according to the television standards in the United States for black and white signals, the horizontal scanning rate is 15,750 cycles per second, so that each scanning line is allotted 63.5 microseconds, of which 53 microseconds is used for reproducing a line of the image. A delay of, say, 2.5 microseconds in one signal compared with the other results in a ghost image delayed or displaced from the main image by about 5% of the horizontal dimension of the screen. In accordance with the invention, by adding an additional delay of 61 microseconds, making a total of 63.5 microseconds, the ghost is displaced downwardly from the desired signal to the next scan line without any horizontal displacement. The ghost is then relatively unnoticeable and unobjectionable.

Figure 2:
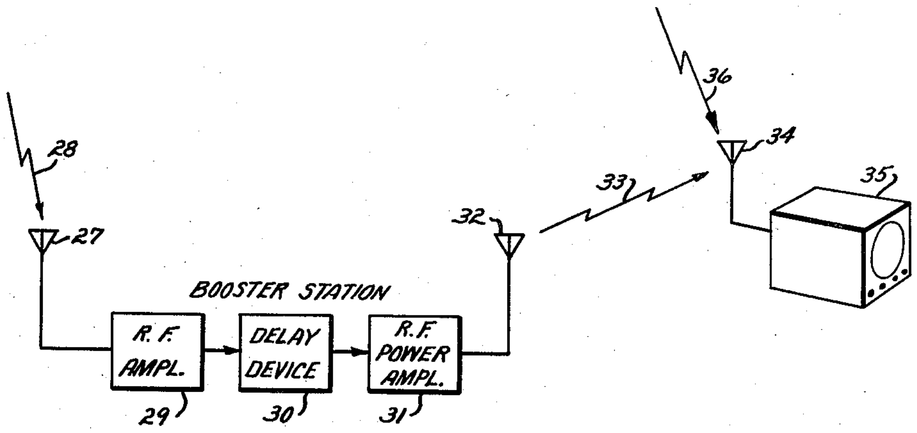

These and other objects and aspects of the invention will be apparent to those skilled in the art from the following more detailed description taken in conjunction with the appended drawings, wherein:

Figure 1 is a diagram illustrating a community master antenna system including a delay device according to this invention, and an independent television receiver which receives a television signal directly and also an undesired signal from the master antenna system; and Figure 2 shows a booster station constructed according to this invention to minimize ghost images on a television receiving set positioned where it is capable of also receiving a signal directly from the remote television transmitter.

Figure 1 shows a master antenna system including a master antenna 10 located, for example, on a hilltop where signals can be received directly over path 9 from a distant television transmitter. The television signal received by antenna 10 is amplified in a radio frequency amplifier 11 and is sent over a coaxial distribution network 12 to a plurality of television receivers 13 located in homes in a valley where the television signal cannot conveniently be received directly from the transmitting station. The coaxial transmission lines 12 may extend a considerable distance such as several miles thru a community in a valley. It therefore is necessary to add additional radio frequency amplifiers 15 at various points along the distribution line.

Participation in a community system is on a voluntary basis and there may be those who prefer to use their own high gain receiving antennas to pick up the television signal directly from the transmitting antenna over path 20. If such a high gain receiving antenna 16 is located near the coaxial distribution line 12 or a radio frequency amplifier 15 of the community system, the signal may be received by the independent antenna 16 over a second path designated 17 from the radio frequency amplifier 15. It is economically impractical to so perfectly shield the radio frequency amplifier 15 that absolutely no energy is radiated therefrom. The television signal received over the path 17 by the antenna 16 and the television receiver 18 is delayed relative to the signal received directly over the path 20 because of the delays introduced as the signal goes thru the radio frequency amplifier 11 and the coaxial distribution line 12. A radio frequency signal travels more slowly thru a coaxial line than it does as a radio wave passing thru free space.

In the absence of a delay device 25 to be described, the signal received by television receiver 18 over the path 20 produces an image on the face of the television set which is followed by a horizontally displaced ghost image due to receipt of the same signal over the second path including the master antenna 10, radio frequency amplifier 11, the coaxial distribution line 12, the radio frequency amplifier 15, and the path 17 thru free space to the antenna 16. The delay in the usual community television distribution system is sufficiently great so that the ghost image appearing on the face of an independent television receiver is horizontally displaced to such an extent as to be very disturbing to the viewer.

According to the invention, a delay device 25 is inserted in the coaxial transmission line 12. The delay device 25 adds sufficient additional delay so that in combination with the delay inherently introduced by the community system, the total delay is equal to an integral multiple including unity of the time of one complete scan line of the television system. A television scan line in the United States is allotted 63.5 microseconds. The delay device 25 is thus designed to provide a delay so that the signal received over path 17 by the antenna 16 is delayed 63.5 microseconds relative to the signal received directly over path 20. The ghost image appearing on the television receiver 18 from the signal over path 17 is thus displaced downwardly without any horizontal displacement. The picture is displaced downwardly by a distance equal to the distance between successive scan lines. This displacement of the ghost image is relatively small and is unobjectionable to the viewer.

A delay device may be inserted at several points along a long community distribution line to minimize ghost images on adjacent independent television receivers. For example, if the total delay in the path is made three times 63.5 microseconds, the ghost image on an independent television receiver will be shifted downwardly by three scan lines. The amount of delay is much too slight to be noticed as an echo in the audio portion of the television signal.

Figure 2 shows a booster station having a receiving antenna 27 for receiving a television signal from a distant transmitter over a path 28. The received signal is amplified in a radio frequency amplifier 29 having an output applied thru a delay device 30 to a radio frequency power amplifier 31. The signal from the power amplifier 31 is applied to a transmitting antenna 32 from which the energy is radiated over a path 33 to a receiving antenna 34 connected to a conventional television receiver 35. The booster station may be located on a hilltop where the television signal is easily received from a distant transmitter. The television receiver 35 represents a television receiver located in a valley where a signal cannot be easily received directly over a path 36 from the television transmitter. However, the television receiver 35 represents one so located that it can receive enough of a signal over path 36 to cause a ghost image on the face of the television screen. Alternatively, the television receiver 35 may be located where it receives a strong signal over the path 36 directly from the television transmitter, and a weaker ghost-producing signal over the path 33 via the booster station. The ghost image on the face of the television set 35 will appear displaced to the right or to the left of the main image depending on whether the stronger signal is receiver over path 36 or over path 33, respectively.

The delay device 30 in the booster station is designed to provide an amount of delay such that the signal over the path via the booster station arrives at the antenna 35 at a time 63.5 microseconds later than the signal over the direct path 36. By employing the delay device 30 in the booster station, the ghost image on the television receiver 35 is displaced upwardly or downwardly, but not horizontally. The vertical displacement is one scan line which is relatively slight so that the ghost is relatively unnoticeable and unobjectionable.

In the systems of Figures 1 and 2, the delay devices 25 and 30, respectively, are shown in radio frequency paths. It will be understood that the signal received by the master antenna system or the booster station may be demodulated to an intermediate frequency, and have the delay device positioned in the intermediate frequency portion of the path. Similarly, the signal may be further demodulated to a video signal, and the delay device may be positioned in the video portion of the circuit.

Many types of delay devices are suitable for use to provide the desired amount of delay to the signal in the corresponding path. For example, a sufficient length of coaxial line arranged in a coil for compactness may serve as the delay device. Alternatively, a delay line may be constructed of lumped inductive and capacitive elements. In place of the foregoing electrical delay devices, mechanical delay devices may be employed. A mechanical delay line operates on the principle that sound waves travel more slowly thru solid media than electrical waves travel thru an electrical network. A mechanical delay line includes means to convert the electrical energy into mechanical sound energy which is passed thru the solid medium, and means to re-convert the sound energy at the end of the passage back to electrical energy. Fused quartz is an especially useful solid medium for mechanical delay lines. Mercury delay lines are also commonly employed. The conversion of the electrical energy to mechanical energy, and vice versa, may be accomplished by piezoelectric transducers, or by magnetostrictive transducers.

It is apparent that according to this invention there is provided an improved means for minimizing ghost images on the independent television receiver screens capable of receiving the same signal over two paths of unequal electrical length.

What is claimed is:

1. In a television system having a scanning frequency such that corresponding points on successive scan lines are separated by a given time, and wherein a receiver is receptive to a transmitted signal over two paths, a delay device serially inserted in only one of said paths, said delay device providing a delay such that the signal over the two paths arrive at said receiver at times differing by substantially an integral multiple including unity of said given time.

2. In a television system having a scanning frequency such that corresponding points on successive scan lines are separated by a time $t$, and wherein a receiver is receptive to a transmitted signal over first and second paths such that the signal is received over the second path at a time $t'$ following the receipt over the first path, a delay device serially inserted solely in the second path, said delay device providing a delay substantially equal to $t-t'$.

3. In a television system having a scanning frequency such that corresponding points on successive scan lines are separated by a time $t$, and wherein a receiver is receptive to a transmitted signal over a direct path, the combination of, a second path including a receiving antenna and a radio frequency amplifier from which radio frequency energy reaches said receiver, and a delay device serially inserted solely in said path between said receiving antenna and said amplifier, said delay device providing a delay such that the signals over the two paths arrive at said receiver at times differing by substantially an integral multiple including unity of said time $t$.

4. A community master television antenna system comprising, a master antenna, a radio frequency amplifier having an input coupled to said antenna, a signal distribution system having an input connected to the output of said amplifier, and a delay device serially inserted at a point in said distribution system, said delay device introducing a delay which together with the delay inherent in the preceding portion of the system equals an odd multiple including unity of the time period between corresponding points of successive scan lines of the television system.

5. A television booster station comprising, a receiving antenna, a transmitting antenna, and signal amplifying means between said receiving and transmitting antennas, said amplifying means including a delay device acting to delay the signal by an amount such that the transmitted signal is delayed relative to the received signal by an amount equal to substantially the time interval between corresponding points on successive scan lines of the television system.

References Cited in the file of this patent

UNITED STATES PATENTS

| | | |
|---|---|---|
| 2,310,692 | Hansell | Feb. 9, 1943 |
| 2,386,087 | Bingley et al. | Oct. 2, 1945 |
| 2,448,635 | Smith | Sept. 7, 1948 |
| 2,552,160 | Espley | May 8, 1951 |

OTHER REFERENCES

Radio and Television News, pages 31–34, March 1951.